(12) United States Patent
Sugihara et al.

(10) Patent No.: US 11,763,999 B2
(45) Date of Patent: Sep. 19, 2023

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Yukiyasu Sugihara, Aichi (JP); Norihiko Ogata, Saga (JP); Kazuhide Gotou, Saga (JP); Yuma Yano, Saga (JP); Yuki Ueda, Osaka (JP); Takeshi Minamiura, Osaka (JP); Masayuki Hogiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/562,098

(22) Filed: Dec. 27, 2021

(65) Prior Publication Data
US 2022/0238282 A1 Jul. 28, 2022

(30) Foreign Application Priority Data
Jan. 28, 2021 (JP) .................. 2021-012244

(51) Int. Cl.
*H01G 9/052* (2006.01)
*H01G 9/00* (2006.01)
*H01G 9/15* (2006.01)

(52) U.S. Cl.
CPC ......... *H01G 9/0525* (2013.01); *H01G 9/0032* (2013.01); *H01G 9/15* (2013.01)

(58) Field of Classification Search
CPC ............................ H01G 9/052; H01G 9/0525
See application file for complete search history.

(56) References Cited

U.S. PATENT DOCUMENTS

| | | | |
|---|---|---|---|
| 4,520,430 A * | 5/1985 | Long | ............ B22F 3/1109 29/25.03 |
| 4,555,268 A | 11/1985 | Getz | |
| 2003/0183042 A1 | 10/2003 | Oda et al. | |
| 2005/0025699 A1 * | 2/2005 | Reed | ............ C01G 33/00 423/594.17 |

FOREIGN PATENT DOCUMENTS

| | | | |
|---|---|---|---|
| JP | 61-149401 | 7/1986 | |
| JP | 2001-345238 | 12/2001 | |
| WO | WO-2006062234 A1 * | 6/2006 | ........ B22F 3/11 |

* cited by examiner

*Primary Examiner* — Eric W Thomas
(74) *Attorney, Agent, or Firm* — McDermott Will & Emery LLP

(57) ABSTRACT

An electrolytic capacitor includes an anode body having a porous structure, an anode lead partially embedded in the anode body, a dielectric layer formed on a surface of the anode body, and a cathode part that covers at least part of the dielectric layer. The anode body has a first region in which first particles sintered together and a second region in which second particles sintered together. The average particle diameter D1 of the first particles is smaller than the average particle diameter D2 of the second particles. The volume-based pore diameter distribution of the anode body with the dielectric layer has a first peak in a range of less than or equal to 0.5 μm in pore diameter, and a second peak in a range of more than 0.5 μm in pore diameter.

19 Claims, 7 Drawing Sheets

ELECTROLYTIC CAPACITOR AND METHOD FOR MANUFACTURING SAME

BACKGROUND

1. Technical Field

The present disclosure relates to an electrolytic capacitor and a method for manufacturing the same.

2. Description of the Related Art

In recent years, electrolytic capacitors having small equivalent series resistance (ESR) and excellent frequency characteristics have been developed. An electrolytic capacitor includes an anode body having a porous structure, a dielectric layer formed on the surface of the anode body, and a cathode part that covers at least a part of the dielectric layer.

The anode body is formed by sintering a molded body of metal particles. The molded body is typically manufactured by disposing an anode lead at a predetermined position of a mold, charging metal particles into the mold, and performing pressure molding.

Unexamined Japanese Patent Publication No. 61-149401 proposes a method for producing a tantalum powder composition that has the following characteristics. More specifically, a flaky tantalum powder is pre-agglomerated by heat-treating the flaky tantalum powder in the temperature range from about 1250° C. to about 1550° C. for about 5 minutes to about 120 minutes. Next, the pre-agglomerated flaky tantalum powder is mixed with a granular tantalum powder to form a tantalum powder composition. Finally, the tantalum powder composition is agglomerated at a temperature from about 1250° C. to about 1550° C. for a period from about 5 minutes to about 120 minutes.

Unexamined Japanese Patent Publication No. 2001-345238 proposes a niobium or tantalum powder including aggregated particles that have niobium or tantalum primary particles aggregated, in which the pore distribution measured by a mercury intrusion method has a peak within the range from 1 µm to 20 µm. In addition, Unexamined Japanese Patent Publication No. 2001-345238 proposes a method for producing a niobium or tantalum powder that has the following characteristics. More specifically, a vacancy forming material that has a thermally decomposable or thermally sublimable property and has at least one of a granular shape, a film shape, a foil shape, a flake shape, and a fibrous shape is added to the niobium or tantalum primary particles. Next, a heat treatment is performed to remove the vacancy forming material and form aggregated particles.

SUMMARY

An electrolytic capacitor according to one aspect of the present disclosure includes an anode body having a porous structure, an anode lead partially embedded in the anode body, a dielectric layer disposed on a surface of the anode body, and a cathode part that covers at least part of the dielectric layer. The anode body has a first region in which first particles sintered together and a second region in which second particles sintered together. The average particle diameter D1 of the first particles is smaller than the average particle diameter D2 of the second particles. The volume-based pore diameter distribution (Log differential pore volume) of the anode body including the dielectric layer has a first peak in a range of less than or equal to 0.5 µm in pore diameter, and a second peak in a range of more than 0.5 µm in pore diameter.

A method for manufacturing an electrolytic capacitor according to another aspect of the present disclosure includes: a step of obtaining an aggregated particle mixture; a step of obtaining a molded body; a step of obtaining an anode body; a step of forming a dielectric layer on the surface of the anode body; and a step of forming a cathode part that covers at least part of the dielectric layer. In the step of obtaining the aggregated particle mixture, first aggregated particles obtained by aggregating first particles having an average particle diameter D1 and second aggregated particles obtained by aggregating second particles having an average particle diameter D2 larger than the average particle diameter D1 are mixed. In the step of obtaining the molded body, the aggregated particle mixture is molded. In the step of obtaining the anode body, the molded body is subjected to sintering so as to have a first region in which the first particles sintered together and a second region in which the second particles sintered together. The volume-based pore diameter distribution (Log differential pore volume) of the anode body before forming the dielectric layer has a first peak in a range of less than or equal to 0.5 µm in pore diameter, and a second peak in a range of more than 0.5 µm in pore diameter.

According to the present disclosure, an electrolytic capacitor with favorable capacitance and low ESR can be provided.

DETAILED DESCRIPTION OF EMBODIMENT

Figure 1:
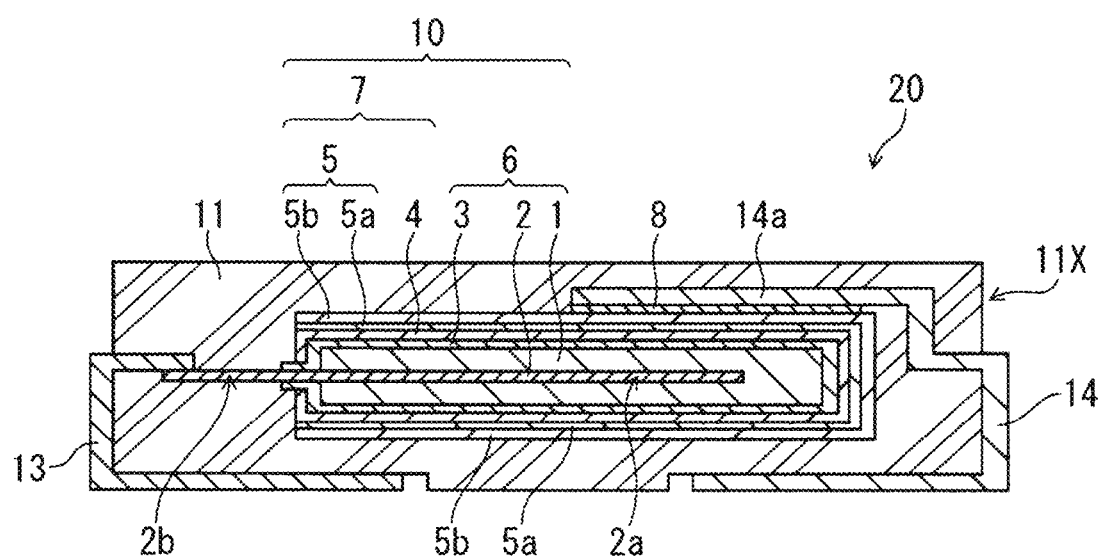
FIG. 1 is a schematic cross-sectional view illustrating an example of an electrolytic capacitor according to an exemplary embodiment of the present disclosure.

According to Unexamined Japanese Patent Publication No. 61-149401, from the viewpoint of improving the handling characteristics of the tantalum powder composition, the pre-agglomerated flaky tantalum powder is mixed with the granular tantalum powder to form a tantalum powder composition, and the tantalum powder composition is agglomerated at a high temperature of 1250° C. or higher. Further, the composition in which the flaky tantalum powder is included approximately at the content from 20 to 40 percent by weight is produced. In this case, the pore diameter formed in the agglomerated tantalum powder composition is increased, thereby making it difficult to obtain sufficient capacitance.

Unexamined Japanese Patent Publication No. 2001-345238 proposes a niobium or tantalum powder that has a vacancy distribution with a peak within the range from 1 μm to 20 μm, inclusive, from the viewpoint of improving the electrolyte solution permeability into the sintered body by forming large vacancies in individual aggregated particles constituting the sintered body. The large vacancies, however, form no conductive path, thereby making it difficult to reduce the ESR.

Hereinafter, an exemplary embodiment of the present disclosure will be described with reference to examples, but the present disclosure is not limited to the examples described below. In the following description, specific numerical values and materials may be provided as examples, and thus other numerical values and materials may be applied as long as the effect of the present disclosure can be obtained. It is to be noted that constituent elements of known electrolytic capacitors may be applied to constituent elements other than parts that are characteristic of the present disclosure. In this specification, the case of "a range from a numerical value A to a numerical value B" includes the numerical value A and the numerical value B.

[Electrolytic Capacitor]

An electrolytic capacitor according to one aspect of the present disclosure includes a capacitor element including an anode body having a porous structure, an anode lead partially embedded in the anode body, a dielectric layer formed on the surface of the anode body, and a cathode part that covers at least part of the dielectric layer.

The capacitor element is classified into an anode part and a cathode part. The anode body and the anode lead constitute the anode part. The configuration of the cathode part is not particularly limited, and may be a known cathode part or a cathode part that has a configuration similar to the known cathode part.

The electrolytic capacitor may include a first terminal electrically connected to the anode part (specifically, the anode lead) of the capacitor element, and a second terminal electrically connected to the cathode part. The electrolytic capacitor may include an exterior resin disposed around the capacitor element. Each of the first terminal and the second terminal partially extends to the outside of the outer packaging resin. The second terminal has a connection surface with the cathode part. The connection surface is connected to the cathode part via, for example, a conductive member.

The shape, size, and the like of the capacitor element are not particularly limited, and the capacitor element may be a known capacitor element or a capacitor element that has a configuration similar to the known capacitor element.

(Anode Body)

The anode body having a porous structure is formed by sintering a molded body of particles. The anode body is formed by molding particles as a material and sintering the molded body. Examples of the particles as a material include metal particles, alloy particles, and metal compound particles. One of these kinds of particles may be used alone, or two or more thereof may be used in mixture.

In the present exemplary embodiment, the anode body has a first region in which first particles sintered together and a second region in which second particles sintered together. The average particle diameter D1 of the first particles is smaller than the average particle diameter D2 of the second particles. The first region constituted by a sintered body of relatively small particles is required for providing the anode body with a sufficiently large specific surface area. And the increase in specific surface area contributes to an increase in electrostatic capacity. On the other hand, the second region constituted by a sintered body of relatively large particles is low in bulk resistance, and relatively large voids are formed in the second region. The cathode part for drawing electricity is likely to infiltrate such voids, thereby forming a cathode part that has a thick conductive path. The ESR of the electrolytic capacitor can be reduced by a combination of the reduction in bulk resistance and the thick conductive path.

In this regard, the volume-based pore diameter distribution (Log differential pore volume) of the anode body has a first peak in a range of less than or equal to 0.5 μm in pore diameter, and a second peak in a range of more than 0.5 μm in pore diameter. The first peak is a peak mainly derived from the first region. The second peak is a peak mainly derived from the second region. From the viewpoint of securing sufficiently large electrostatic capacity, the first peak is preferably sufficiently large. On the other hand, the presence of the second peak means that the second region advantageous for reducing the ESR is sufficiently formed inside the anode body. From the viewpoint of achieving sufficiently small ESR, the second peak is preferably sufficiently large.

The volume-based pore diameter distribution of the anode body including the dielectric layer is shifted so as to become smaller than the volume-based pore diameter distribution of the anode body before forming the dielectric layer. Meanwhile, the shift amount is slight because a thickness of the dielectric layer is in the order of nm. Thus, the volume-based pore diameter distribution of the anode body is not significantly changed between before and after forming the dielectric layer. Accordingly, in the case where the volume-based pore diameter distribution of the anode body including the dielectric layer has the first peak in a pore diameter range of less than or equal to 0.5 μm and the second peak in a pore diameter range of more than 0.5 μm, the volume-based pore diameter distribution of the anode body before forming the dielectric layer also has the first peak in a pore diameter range of less than or equal to 0.5 μm and the second peak in a pore diameter range of more than 0.5 μm. Conversely, in the case where the volume-based pore diameter distribution of the anode body before forming the dielectric layer has the first peak in a pore diameter range of less than or equal to 0.5 μm and the second peak in a pore diameter range of more than 0.5 μm, the volume-based pore diameter distribution of the anode body including the dielectric layer also has the first peak in a pore diameter range of less than or equal to 0.5 μm and the second peak in a pore diameter range of more than 0.5 μm.

From the viewpoint of securing a sufficiently large electrostatic capacity, the height of the first peak is preferably larger than the height of the second peak. The height of the first peak is sufficiently larger than the height of the second peak, thereby making it possible to achieve sufficiently small ESR while securing sufficiently large electrostatic capacity. The height of the first peak may be, for example, 1.5 times or more or 1.8 times or more as large as the height of the second peak.

The average particle diameter D1 of the first particles may be, for example, less than or equal to 1 μm, or less than or equal to 0.3 μm. Further, the average particle diameter D2 of the second particles may be, for example, 3 μm or more, or 5 μm or more. The use of such first particles and second particles makes it easier to obtain an anode body that has a volume-based pore diameter distribution with a sharp first peak in a range of less than or equal to 0.5 μm and a clear second peak in a range of more than 0.5 μm.

The average particle diameter D1 of the first particles and the average particle diameter D2 of the second particles can be determined, for example, by the following method. First, a cross section of the anode body before or after the formation of the dielectric layer is formed, and processed by polishing and a cross polisher. Thereafter, the processed cross section is observed with a scanning electron microscope (SEM), and a cross-sectional image of the anode body is taken. The cross-sectional image is analyzed with the use of image analysis-type particle size distribution measurement software (for example, MAC-View (Mountech Co., Ltd.)) to specify the contours of one hundred particles for each of the first particles and second particles, and determine the particle diameters of equivalent circles that have the same areas as the areas surrounded by the contours. The average value of the particle diameters of the equivalent circles for the one hundred first particles is regarded as an average particle diameter D1, and the average value of the particle diameters of the equivalent circles for the one hundred second particles is regarded as an average particle diameter D2.

The volume-based pore diameter distribution (Log differential pore volume) of the anode body before or after the formation of the dielectric layer can be measured by separating the cathode part from the anode body, if necessary, and using, for example, a mercury intrusion porosimeter (for example, AutoPore V from Micromeritics Instrument Corporation). The method for separating the cathode part from the anode body is not particularly limited, but for example, the solid electrolyte layer of the cathode part can be removed from the anode body by using a fuming nitric acid.

In the case where it is not possible to separate the cathode part from the anode body with the dielectric layer, the volume-based pore diameter distribution can be determined in accordance with the measurement of the average particle diameter. More specifically, a cross-sectional image of the processed anode body with the dielectric layer is taken with a scanning electron microscope (SEM), and the cross-sectional image is analyzed with the use of image analysis-type particle size distribution measurement software to distinguish the anode body with the dielectric layer from the other regions (hereinafter, referred to as a region R). The region R is a region occupied by the voids before the formation of the cathode part. Accordingly, the region R corresponds to the pores of the anode body with the dielectric layer. Next, the contours of the pores are specified by regarding the region R (that is, pores) as particles, and equivalent circles that have the same areas as the areas surrounded by the contours are determined as pore diameters. The distribution of all of the measured pore diameters is determined, and the Log differential pore volume is calculated. It is to be noted that the area of the cross-sectional image to be analyzed is 0.01 mm$^2$ or more per visual field. The same measurement may be performed in multiple visual fields (for example, five visual fields) to determine the distribution of all of the obtained pore diameters.

In the volume-based pore diameter distribution (Log differential pore volume) of the anode body, the difference between the pore diameter d1 corresponding to the first peak and the pore diameter d2 corresponding to the second peak may be, for example, 0.4 μm or more, for example, 0.45 μm or more, or further 0.5 μm or more.

The pore diameters d1 and d2 may be determined by approximating the measurement result of the volume-based pore diameter distribution (Log differential pore volume) to the sum of two log-normal distributions. When the measurement result of the volume-based pore diameter distribution (Log differential pore volume) is approximated by the sum of the log-normal distribution A1 (also referred to as a log-normal distribution corresponding to d1) corresponding to the first peak and the log-normal distribution A2 (also referred to as a log-normal distribution corresponding to d2) corresponding to the second peak, the approximate expression is B((1−P2)A1+P2A2). In this regard, B represents a constant, and P2 represents the proportion of the pore volume constituting the second peak to the total pore volume. The relationship between the logarithm of the pore diameter and the Log differential pore volume, calculated as a normal distribution corresponding to the first peak, is referred to as the log-normal distribution A1. The average value of the log-normal distribution A1 is represented by log d1, and the standard deviation is represented by σ1. The relationship between the logarithm of the pore diameter and the Log differential pore volume, calculated as a normal distribution corresponding to the second peak, is referred to as the log-normal distribution A2. The average value of the log-normal distribution A2 is represented by log d2, and the standard deviation is represented by σ2. From the approximate expression: B((1−P2)A1+P2A2), the proportion P2 of the pore volume constituting the second peak to the total pore volume is calculated.

The proportion of the pore volume constituting the second peak may be, for example, 18% or more, 20% or more, or further 25% or more of the total pore volume.

The fact that the pore diameter d1 and the pore diameter d2 are separated from each other by 0.4 μm or more means that multiple paths having different functions from each other can be formed in the anode body. As the pore diameter d2 is larger, the conductive path formed by the cathode part in the second region is more likely to be thicker, which is advantageous for reducing the ESR. Meanwhile, since the second region has a relatively small specific surface area, it is hard to contribute increase in electrostatic capacity. In other words, the electrostatic capacity of the electrolytic capacitor is mainly governed by the structure of the first region. As the pore diameter d1 is smaller, the specific surface area of the first region is larger, and thus the electrostatic capacity is increased. The fine conductive path formed by the cathode part in the first region functions as a branch conductive path leading to the thick conductive path in the second region. As a result, a conductive path that is excellent in current collection property as a whole is formed.

From the viewpoint of adjusting the difference between the pore diameter d1 and the pore diameter d2 to be 0.4 μm or more, the pore diameter d1 and the pore diameter d2 may be respectively less than or equal to 0.5 μm and equal to or more than 0.7 μm, less than or equal to 0.5 μm and equal to or more than 0.8 μm, or less than or equal to 0.45 μm and equal to or more than 0.8 μm.

The second particles may be flaky particles that are higher in aspect ratio than the first particles. The flaky particles refer to shapes that have three parameters of a major axis, a minor axis, and a thickness. The major axis is the maximum diameter of the second particle. The minor axis is a maximum diameter in a direction perpendicular to the major axis. The thickness is a length in a direction perpendicular to the major axis and the minor axis, and is shorter than the minor axis. The thickness is measured at the center that bisects the major axis of the second particle.

The aspect ratio of the second particle refers to the ratio of the major axis to the thickness of the second particle. The aspect ratio of the second particle is, for example, 5 or more, and may be 8 or more, or may be 10 or more. The upper limit of the aspect ratio of the second particle is, for example, 100, but is not to be considered limited thereto.

The aspect ratio of the second particle can be measured in a cross section where the thickness of the second particle of the anode body can be observed. Specifically, first, a cross section of the anode body is formed so as to be parallel to the thickness direction of the second particle. The maximum diameter that can be observed in this cross section is measured as the major axis. The aspect ratio of the second particle is measured for a sufficient number (for example, 30 or more) of second particles arbitrarily selected, and the average value therefor is calculated.

The aspect ratio of the first particle may be determined in a cross section where the thickness of the second particle of the anode body can be observed. The aspect ratio of the first particle refers to the ratio of the major axis to the minor axis of the first particle. The major axis is the maximum diameter of the first particle. The minor axis is a maximum diameter in a direction perpendicular to the major axis. The aspect ratio of the first particle is measured for a sufficient number (for example, 30 or more) of first particles arbitrarily selected, and the average value therefor is calculated.

The first region and the second region are preferably formed in a well-balanced manner in order to provide the anode body including the dielectric layer to have the first peak and the second peak each having a sufficient height, and then achieve high electrostatic capacity and low ESR. Specifically, in the cross section of the anode body, the proportion of the area of the second region to the total area of the first region and second region ranges, for example, from 2% to 40%, inclusive, and may range from 5% to 30%, inclusive.

The proportion of the area of the second region to the total area of the first region and second region can be determined, for example, by the following method. First, cross sections of the anode body are formed from three planes orthogonal to each other, and each cross section is processed by polishing and a cross polisher. Thereafter, the processed cross section is observed with a scanning electron microscope (SEM), and a cross-sectional image of the anode body is taken. The cross-sectional image is subjected to image processing, the contour of the second region is specified, and the area surrounded by the contour is determined. The contour of the second region is obtained by connecting the outer edges of the second particles located on the outermost side of each second region. The area of the voids included inside the contour is also included in the area of the second region. The proportion of the area of the second region to the area of the observed field is the proportion of the second region to the first region and the second region. A number of observed fields subjected to the measurement is five or more in each cross section. The size of each observed field is adjusted to 0.01 mm$^2$ or more. The average value is determined for the proportions of the areas of the second regions obtained in all of the observed fields.

As a metal that forms the anode body (that is, the sintered body), a valve metal is used, such as aluminum (Al), titanium (Ti), tantalum (Ta), niobium (Nb), zirconium (Zr), or hafnium (Hf) One of these metals may be used alone, or two or more thereof may be used in combination. Among the metals, at least one of tantalum and niobium is desirably used.

(Anode Lead)

The anode lead is made of a metal. The anode lead is partially embedded in the anode body, and the remaining part is protruded from the anode body. More specifically, the anode lead has an embedded part buried in the anode body and a protrusion protruded to the outside of the anode body.

(Dielectric Layer)

The dielectric layer formed on the surface of the anode body is not particularly limited, and may be formed by a known method. For example, the dielectric layer is formed by anodizing the anode body and causing a growth of an oxide film at the surface of the anode body. The anodization may be performed by immersing the anode body in an anodizing solution to anodize the surface of the anode body. Alternatively, a gas phase method such as an atomic layer deposition method (ALD method) may be used, or the surface of the anode body may be oxidized by heating the anode body under an atmosphere containing oxygen.

(Cathode Part)

The cathode part has, for example, a solid electrolyte layer. The cathode part may include a cathode layer that covers at least part of the solid electrolyte layer. It is to be noted that an electrolyte including an electrolytic solution may be employed instead of the solid electrolyte.

The solid electrolyte layer is not particularly limited, and solid electrolytes for use in known electrolytic capacitors may be applied. The solid electrolyte layer may be a laminate of two or more different solid electrolyte layers. The solid electrolyte layer is disposed so as to cover at least part of the dielectric layer. The solid electrolyte layer may be formed with the use of a manganese compound or a conductive polymer.

The conductive polymer may be a π-conjugated polymer, and examples of the conductive polymer include polypyrrole, polythiophene, polyaniline, and derivatives thereof. These polymers may be used alone, or multiple types thereof may be used in combination. Alternatively, the conductive polymer may be a copolymer from two or more types of monomers. It is to be noted that the derivative of the conductive polymer means a polymer with the conductive polymer as a basic skeleton. For example, examples of the polythiophene derivative include poly(3,4-ethylenedioxythiophene).

A dopant is preferably added to the conductive polymer. The dopant can be selected depending on the conductive polymer, and known dopants may be used. Examples of the dopant include naphthalenesulfonic acid, p-toluenesulfonic acid, polystyrenesulfonic acid, and salts thereof. An example of the solid electrolyte layer is formed with the use of poly(3,4-ethylenedioxythiophene) (PEDOT) doped with polystyrenesulfonic acid (PSS).

The solid electrolyte layer containing a conductive polymer is formed on at least part of the dielectric layer by a method of impregnating the dielectric layer with a monomer or an oligomer, and then polymerizing the monomer or the oligomer in accordance with chemical polymerization or electrolytic polymerization, or by impregnating the anode body with the dielectric layer formed, with a solution of or a dispersion liquid of the conductive polymer (and a dopant, if necessary), and drying the solution or the dispersion liquid.

The cathode layer may be a conductive layer formed on the solid electrolyte layer, and may be, for example, a conductive layer formed so as to cover the solid electrolyte layer. The cathode layer may include a carbon layer formed on the solid electrolyte layer and a metal-paste layer formed on the carbon layer. The carbon layer may be formed from a conductive carbon material such as graphite and a resin. The metal-paste layer may be formed from metal particles (for example, silver particles) and a resin, and may be formed from, for example, a known silver paste.

[Method for Manufacturing Electrolytic Capacitor]

First, a method for manufacturing the anode body will be described.

The anode body is formed by sintering a molded body of the aggregated particle mixture. The aggregated particle mixture is a mixture of the first aggregated particles which are the first particles aggregated and the second aggregated particles which are the second particles aggregated. The first aggregated particles are obtained by heating and then agglomerating the first particles. The second aggregated particles are obtained by heating and then agglomerating the second particles. More specifically, the first particles and second particles agglomerated in advance and are mixed.

If the first particles and the second particles are both mixed as first particles without being aggregated, the first particles and the second particles are homogeneously mixed, thus making it difficult to provide the volume-based pore diameter distribution of the anode body which has the first peak and the second peak. In the case where at least the second particles are not aggregated in advance, the anode body fails to have any second region in which second particles sintered together. Thus, it is not possible to reduce the bulk resistance or form the cathode part with a thick conductive path, and it is difficult to sufficiently reduce the ESR of the electrolytic capacitor. In the case where only the second particles are aggregated in advance, whereas the first particles are not aggregated, the first particles will enter into relatively large voids or pores formed in the second aggregated particles, thus making it difficult to provide the volume-based pore diameter distribution of the anode body with the second peak.

The use of the aggregated particle mixture in which the first particles and second particles agglomerated in advance are mixed allows the volume-based pore diameter distribution of the anode body to be provided with the first peak and the second peak.

The peak particle diameter SD1 corresponding to the maximum frequency in the volume-based particle size distribution of the first aggregated particles and the peak particle diameter SD2 corresponding to the maximum frequency in the volume-based particle size distribution of the second aggregated particles are each 10 μm or more, more preferably 50 μm or more. The peak particle diameters SD1 and SD2 are each adjusted to 10 μm or more, thereby making it easier to provide the volume-based pore diameter distribution of the anode body which has the first peak and the second peak. Further, the peak particle diameters SD1 and SD2 are each 50 μm or more, thereby making it easier to mix the first aggregated particles and the second aggregated particles. On the other hand, the peak particle diameters SD1 and SD2 are adjusted to be less than or equal to 300 thereby facilitating the movement of each aggregated particle during molding, and making the molding density less likely to vary.

In order to mix the first aggregated particles and the second aggregated particles in a well-balanced manner and form the first region and the second region in a well-balanced manner, the peak particle diameter SD2 empirically preferably has a difference of 10% or more, more preferably 15% or more with respect to the peak particle diameter SD1. The presence of such a difference makes it easy to mix the aggregated particles with each other. The reason therefor is not clear, but larger aggregated particles are believed to have the action of loosening smaller aggregated particles.

The peak particle diameters SD1 and SD2 are, for example, particle diameters that reach the maximum frequency in a volume-based particle size distribution obtained in a laser diffraction scattering-type particle size distribution measurement device.

In the step of obtaining the aggregated particle mixture, the proportion of the second aggregated particles to the total of the first aggregated particles and second aggregated particles may range, for example, from 5% by mass to 40% by mass, inclusive, from 5% by mass to 20% by mass, inclusive, or from 10% by mass to 20% by mass, inclusive. In the case where the proportion of the second aggregated particles is less than or equal to 40% by mass, the second aggregated particles are surrounded by the first aggregated particles and thus more likely to thermally shrink, thereby making sintering between the first aggregated particles and the second aggregated particles and sintering between the second aggregated particles more likely to proceed sufficiently.

Next, the aggregated particle mixture is molded into a predetermined shape to obtain a molded body. The shape of the molded body is selected depending on the shape of the anode body. The shape of the anode body is not particularly limited, but for example, the anode body has a pair of main surfaces opposed and side surfaces respectively intersecting the pair of main surfaces. For example, the anode lead is partially embedded in the aggregated particle mixture, and the aggregated particle mixture is subjected to pressure molding into the shape of a column or a rectangular parallelepiped. Then, an anode body with the anode lead partially embedded therein can be formed by sintering the molded body obtained.

Next, the molded body is subjected to sintering to obtain an anode body including a first region in which the first particles sintered together and a second region in which the second particles sintered together.

Next, the anode body is subjected to anodization or the like to form a dielectric layer at the surface of the anode body. Thereafter, a cathode part that covers at least part of the dielectric layer is formed.

Next, a more specific description will be provided with reference to the drawings, but the following examples are not considered to limit the present disclosure. The drawings presented below are considered schematic, and not considered accurately reflect the shape, dimensions, number, or the like of actual members.

FIG. 1 is a schematic cross-sectional view illustrating an example of an electrolytic capacitor according to an exemplary embodiment of the present disclosure. Electrolytic capacitor 20 includes capacitor element 10 including anode part 6 and cathode part 7, exterior resin 11 sealing capacitor element 10, first terminal 13 electrically connected to anode part 6 and partially exposed from exterior resin 11, and second terminal 14 electrically connected to cathode part 7 and partially exposed from exterior resin 11. Anode part 6 includes anode body 1 and anode lead 2. First terminal 13 is joined to anode lead 2. Connection surface 14a of second terminal 14 disposed inside exterior resin 11 is joined to cathode layer 5 via conductive member 8 interposed therebetween.

Dielectric layer 3 is formed on the surface of anode body 1. Cathode part 7 includes solid electrolyte layer 4 that covers at least part of dielectric layer 3, and cathode layer 5 that covers the surface of solid electrolyte layer 4. Cathode layer 5 includes a carbon layer formed so as to cover solid electrolyte layer 4 and a metal-paste layer formed on the surface of the carbon layer. The carbon layer contains a conductive carbon material such as graphite and a resin. The metal-paste layer contains, for example, metal particles (for example, silver) and a resin. It is to be noted that cathode layer 5 is not limited to this configuration. The configuration of cathode layer 5 has only to have a power collection function.

The exterior resin is disposed around the capacitor element such that the capacitor element is not exposed at the surface of the electrolytic capacitor. Furthermore, the exterior resin insulates the first terminal from the second terminal. For the exterior resin, known exterior resins for use in electrolytic capacitors may be applied. For example, the exterior resin may be formed with the use of an insulating resin material that is used for sealing the capacitor element. The exterior resin may be formed by placing the capacitor element in a mold, introducing an uncured thermosetting resin and filler into the mold in accordance with a transfer molding method, a compression molding method, or the like, and then curing the resin and the filler.

The first terminal is an anode terminal electrically connected to the anode part (specifically, anode lead) of the capacitor element. The first terminal is partially exposed from the exterior resin, and is used as an anode external terminal. The first terminal may be formed by, for example, processing a metal sheet (including a metal plate and a metal foil) made of a metal (e.g., copper or a copper alloy) in accordance with a known metal processing method.

The second terminal is a cathode terminal electrically connected to the cathode part of the capacitor element. The second terminal is partially exposed from the exterior resin, and is used as a cathode external terminal. The second terminal may be formed by, for example, processing a metal sheet (including a metal plate and a metal foil) made of a metal (e.g., copper or a copper alloy) in accordance with a known metal processing method.

Hereinafter, examples and comparative examples of the present disclosure will be described, but the present disclosure is not to be considered limited to the following examples.

Examples 1 to 3 and Comparative Example 1

One hundred electrolytic capacitors (rated voltage: 2.5 V, electrostatic capacity: 470 μF) as shown in FIG. 1 were prepared in the following manner, and characteristics of the capacitors were evaluated.

(i) Preparation of Capacitor Element
(i-i) Preparation of Anode Body

Tantalum (Ta) was used as a material for the anode body. A tantalum (Ta) wire was used as an anode wire. One end of the tantalum wire was embedded in the aggregated particle mixture, the aggregated particle mixture was molded into a rectangular parallelepiped, and then the molded body was subjected to sintering in a vacuum. Thus, an anode body (that is, an anode part) made of a porous sintered body of tantalum in which the tantalum wire partially embedded was obtained.

The aggregated particle mixture is a mixture of: first aggregated particles (average particle diameter SD1=100 μm) obtained by aggregation of first particles with an average particle diameter D1=0.2 μm; and second aggregated particles (average particle diameter SD2=150 μm) obtained by aggregation of second particles with an average particle diameter D2=3 μm to 5 μm, inclusive. The proportions by mass of the first aggregated particles and second aggregated particles in the aggregated particle mixture were changed as shown in Table 1. The first particles have an aspect ratio ranging from 1 to 2, inclusive. The second particles are flaky, and have an aspect ratio ranging from 1.5 to 10, inclusive. The average particle diameter D1 of the first particles and the average particle diameter D2 of the second particles before aggregation, and the average particle diameter SD1 of the first aggregated particles and the average particle diameter SD2 of the second aggregated particles, which are described herein, are each a particle diameter that reaches the maximum frequency in a volume-based particle size distribution obtained with a laser diffraction scattering-type particle size distribution measurement device.

Figure 2:
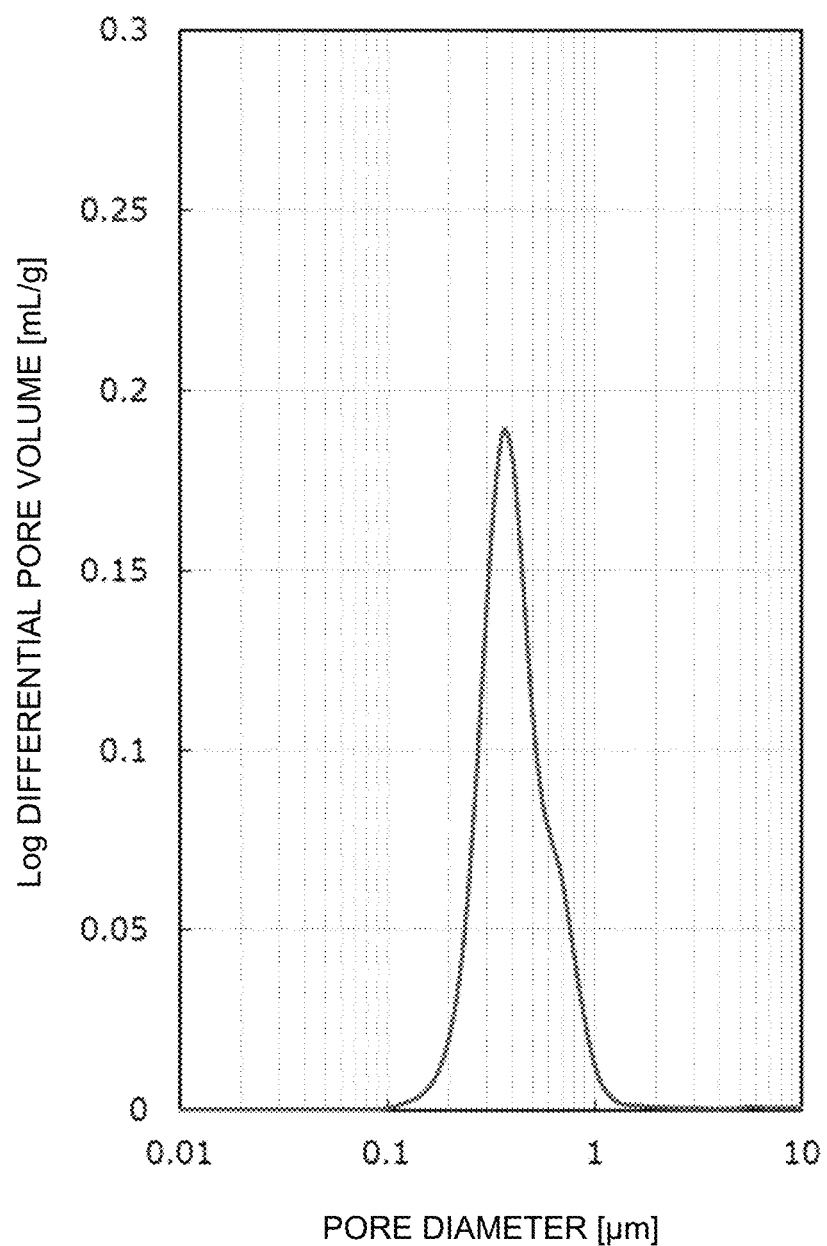
FIG. 2 is a diagram showing a volume-based pore diameter distribution (Log differential pore volume) of an anode body before anodization according to Comparative Example 1.
Figure 3:
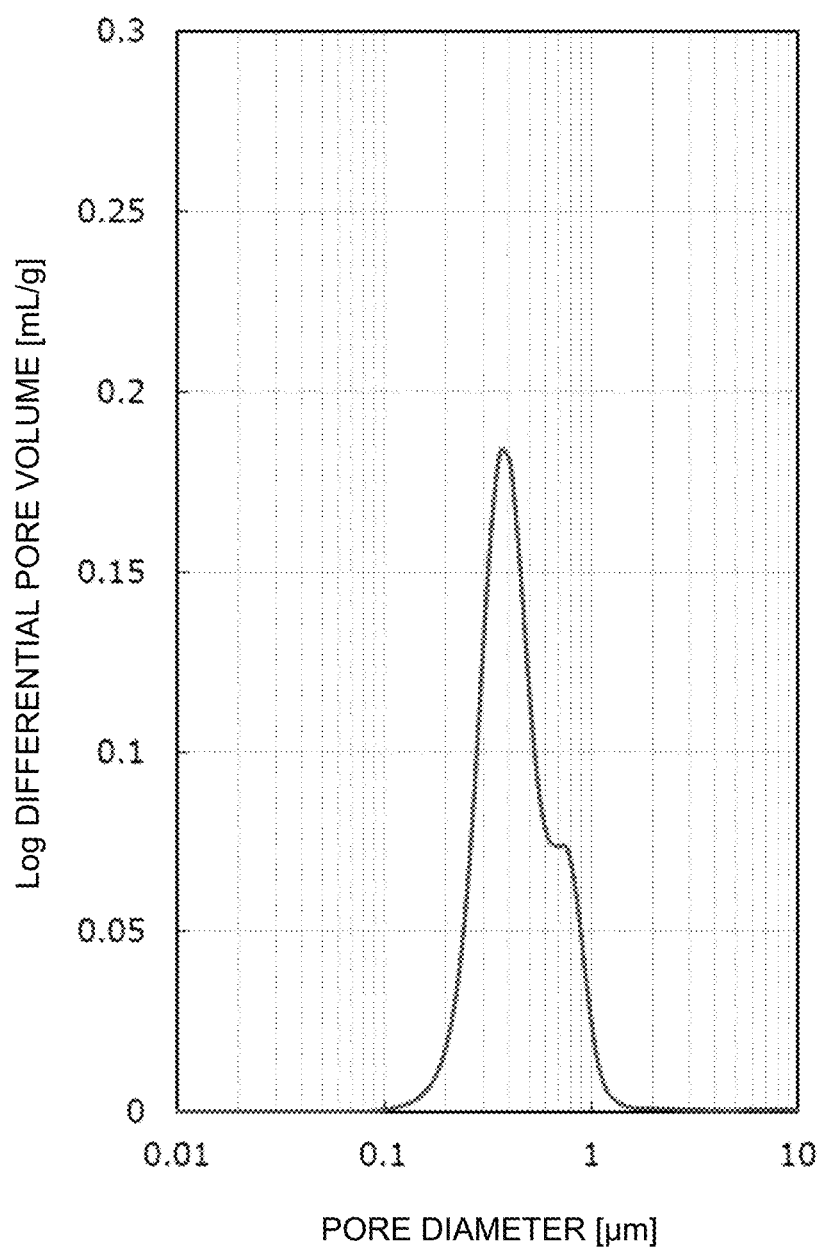
FIG. 3 is a diagram showing a volume-based pore diameter distribution (Log differential pore volume) of an anode body before anodization according to Example 1.
Figure 4:
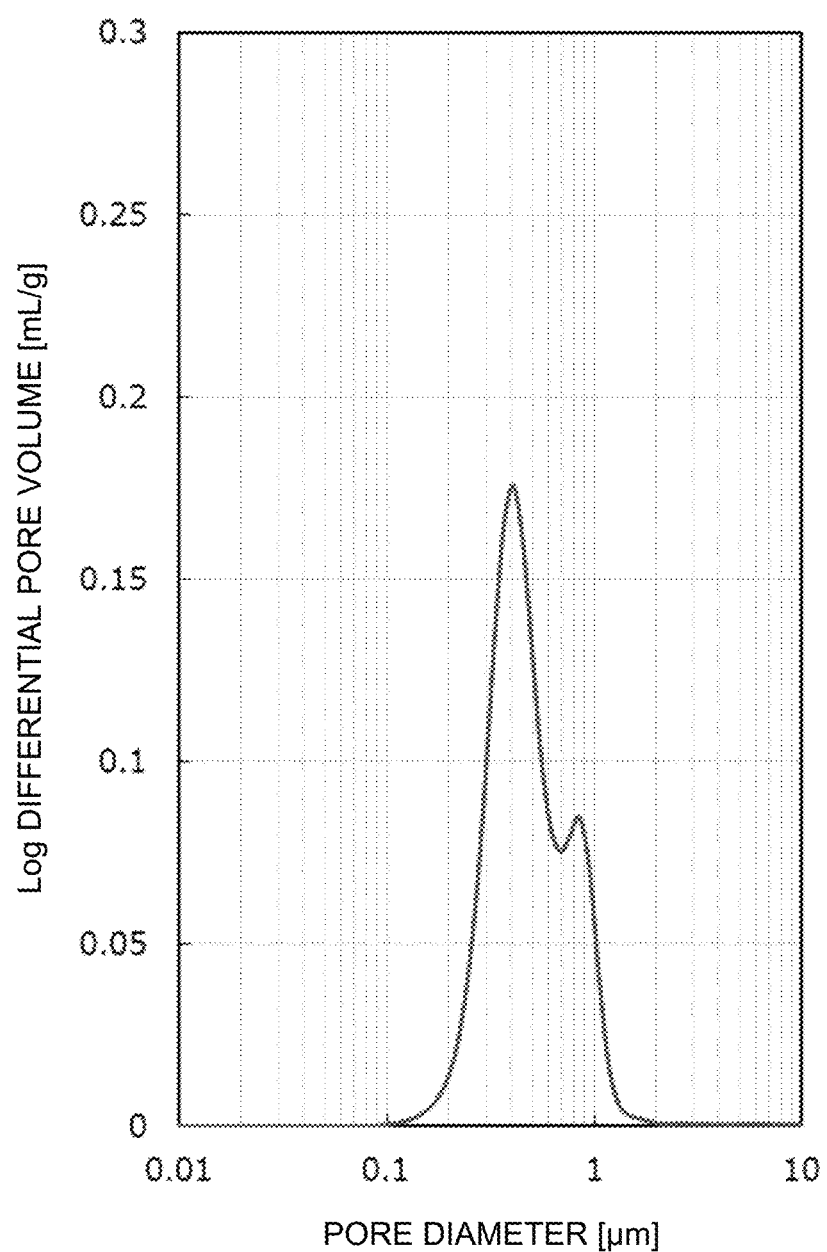
FIG. 4 is a diagram showing a volume-based pore diameter distribution (Log differential pore volume) of an anode body before anodization according to Example 2.
Figure 5:
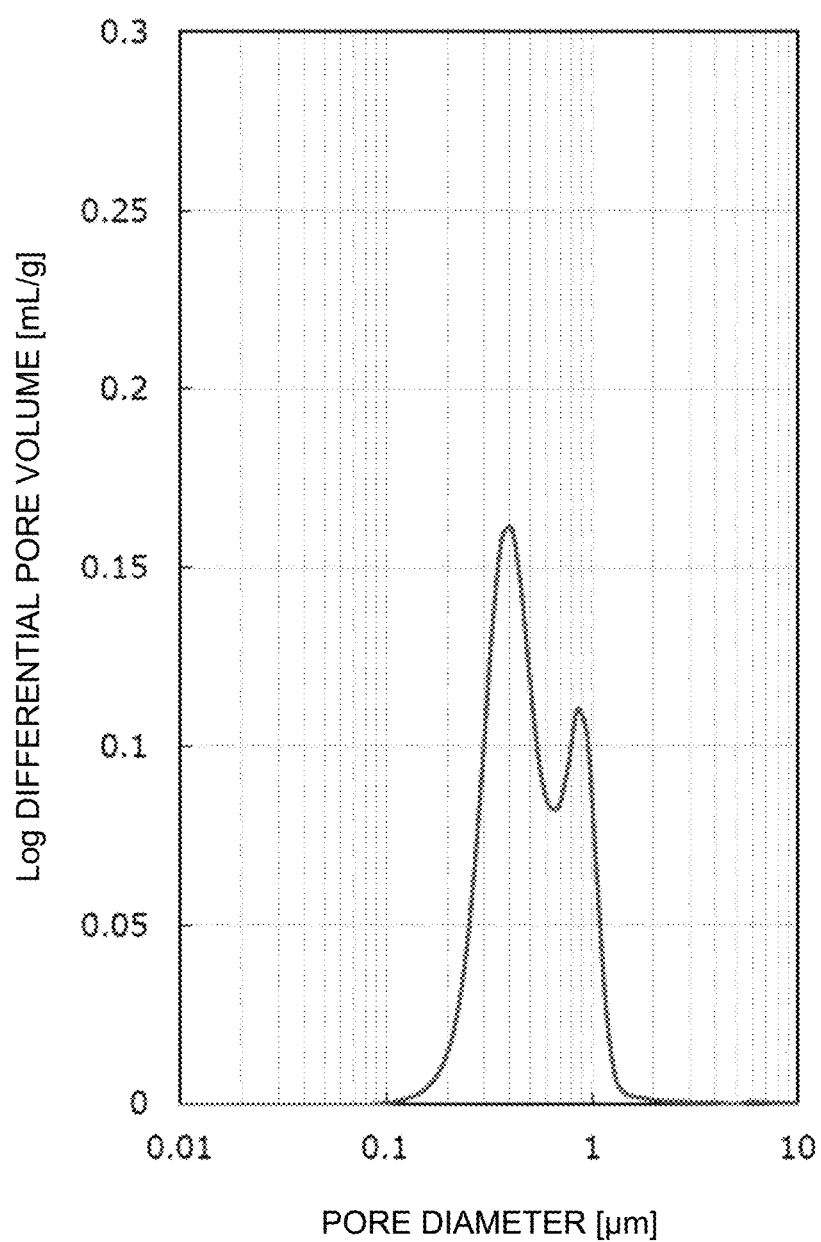
FIG. 5 is a diagram showing a volume-based pore diameter distribution (Log differential pore volume) of an anode body before anodization according to Example 3.

The volume-based pore diameter distributions (Log differential pore volumes) of the obtained anode bodies are shown in FIGS. 2 to 5. In each of anode body X1 according to Example 1 (FIG. 3), anode body X2 according to Example 2 (FIG. 4), and anode body X3 according to Example 3 (FIG. 5), a first peak in a range of less than or equal to 0.5 μm and a second peak in a range of more than 0.5 μm are observed. Further, the height of the first peak is larger than the height of the second peak. The difference between the pore diameter d1 corresponding to the first peak and the pore diameter d2 corresponding to the second peak is 0.4 μm or more, or 0.45 μm or more. In contrast, no substantial second peak is observed in anode body Y1 according to Comparative Example 1 (FIG. 2). In the case where the volume-based pore diameter distribution of anode body Y1 according to Comparative Example 1 is forcibly fitted into the approximate expression with the two log-normal distributions, the difference between the pore diameter d1 corresponding to the first peak and pore diameter d2 corresponding to a virtual second peak is less than 0.4 μm. Further, the proportion P2 of the pore volume constituting the second peak to the total pore volume is 18% or more, or 20% or more in anode bodies X1 to X3, but 16% in anode body Y1.

TABLE 1

|    | First Aggregated Particles (% by mass) | Second Aggregated Particles (% by mass) | d1 (μm) | d2 (μm) | d2 − d1 (μm) | P2 (%) | Δ ESR (%) | Δ Electrostatic Capacity (%) |
|----|----|----|----|----|----|----|----|----|
| Y1 | 100 | 0 | 0.39 | 0.74 | 0.35 | 16 | — | — |
| X1 | 95 | 5 | 0.40 | 0.81 | 0.41 | 19 | −3.8 | −1.6 |
| X2 | 90 | 10 | 0.43 | 0.89 | 0.47 | 23 | −5.0 | −2.2 |
| X3 | 80 | 20 | 0.42 | 0.92 | 0.50 | 29 | −6.3 | −3.7 |

(i-ii) Formation of Dielectric Layer

The anode body and a part of the wire were immersed in an anodization tank filled with a phosphoric acid aqueous solution as an electrolytic aqueous solution to perform anodization, thereby forming a uniform oxide film as a dielectric layer on the surface of the anode body and the surface of the part of the wire. The anodization was performed at an anodization voltage of 10 V in a 0.1% by mass phosphoric acid aqueous solution.

(i-iii) Formation of Solid Electrolyte Layer

A solid electrolyte layer made of a conductive polymer was formed as follows on the anode body with the dielectric layer formed. First, on the surface of the dielectric layer, a precoat layer containing polypyrrole was thinly formed by a chemical polymerization method. Next, on the surface of the precoat layer, a conductive polymer layer containing polypyrrole was formed with the use of an electrolytic polymerization method.

(i-iv) Formation of Carbon Layer

A dispersion liquid of carbon particles (carbon paste) was applied to the solid electrolyte layer, and then heated at 200° C. to form a carbon layer (thickness: about 3 μm) on the surface of the solid electrolyte layer.

(i-v) Formation of Metal Paste Layer

A metal-paste containing silver particles, a binder resin, and a solvent was applied to the surface of the carbon layer. Thereafter, heating was performed at 200° C. to form a metal-paste layer (thickness: 10 μm), thereby providing a capacitor element.

(ii) Preparation of Electrolytic Capacitor

A conductive adhesive serving as a conductive member was applied to the metal-paste layer, and a cathode lead terminal and the metal-paste layer were joined. The wire and an anode lead terminal were joined by resistance welding. Then, the capacitor element with the respective lead terminals joined thereto was sealed with an exterior resin by a transfer molding method to prepare electrolytic capacitors X1 to X3 according to Example 1 to 3 and electrolytic capacitor Y1 according to Comparative Example 1.

[Evaluation (Electrostatic Capacity and ESR)]

For electrolytic capacitors X1 to X3 and Y1 prepared above, the electrostatic capacity values (g) and the ESR values (mΩ) at a frequency of 100 kHz were each measured under an environment at 20° C. with the use of an LCR meter for four-terminal measurement. Table 1 shows the ratio (Δelectrostatic capacity) of the difference value between electrostatic capacity value for each of electrolytic capacitors X1 to X3 and the electrostatic capacity value of electrolytic capacitor Y1 with respect to the electrostatic capacity value of electrolytic capacitor Y1, and the ratio (ΔESR) of the difference value between ESR value for each of electrolytic capacitors X1 to X3 and the ESR value of electrolytic capacitor Y1 with respect to the ESR value of electrolytic capacitor Y1. From Table 1, it can be understood that while the electrostatic capacity values of electrolytic capacitors X1 to X3 are slightly decreased as compared with that of the electrolytic capacitor Y1, the ESR values of electrolytic capacitors X1 to X3 can be significantly reduced as compared with that of the electrolytic capacitor Y1.

Figure 6:
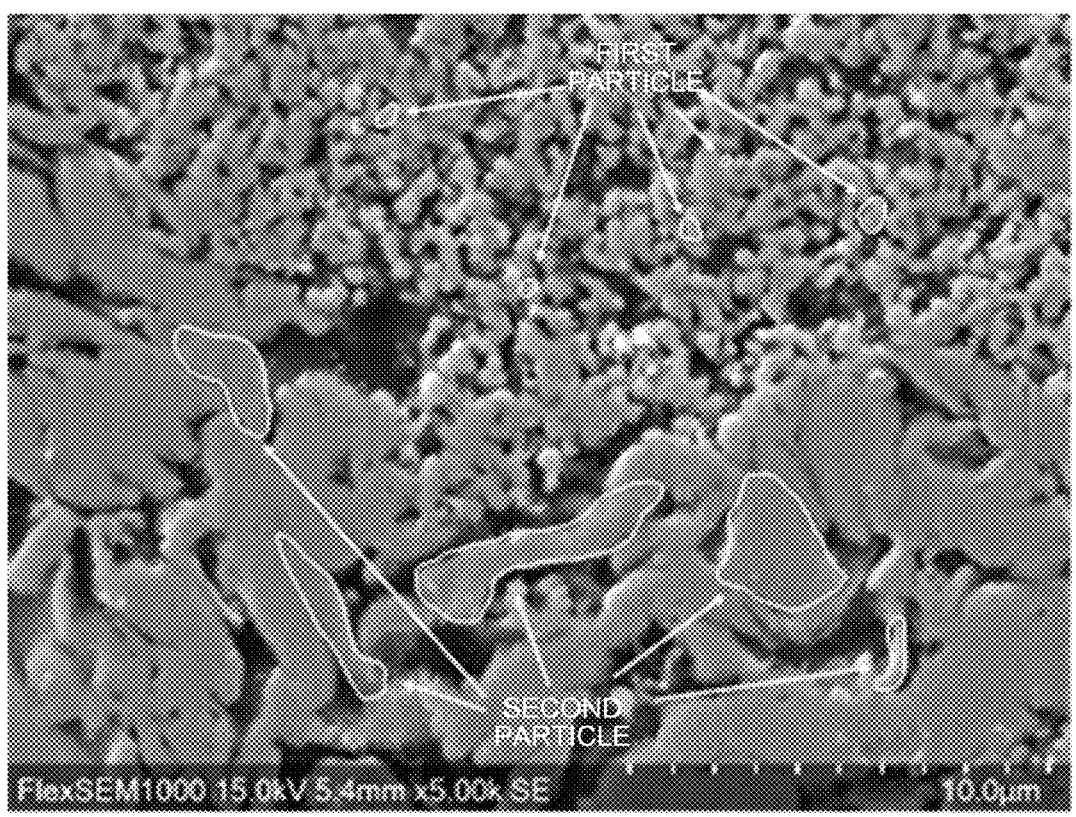
FIG. 6 is a cross-sectional image of the anode body according to Example 2, observed with a scanning electron microscope (SEM) before forming the dielectric layer.

FIG. 6 shows a cross-sectional image of anode body X2, observed with a scanning electron microscope (SEM) before forming the dielectric layer. FIG. 6 shows an example in which the contours of several first particles and second particles are specified. It is also possible to determine the average particle diameter D1 and the average particle diameter D2 from the particle diameters of equivalent circles that have the same areas as the areas surrounded by the contours of the first particles and second particles.

Figure 7:
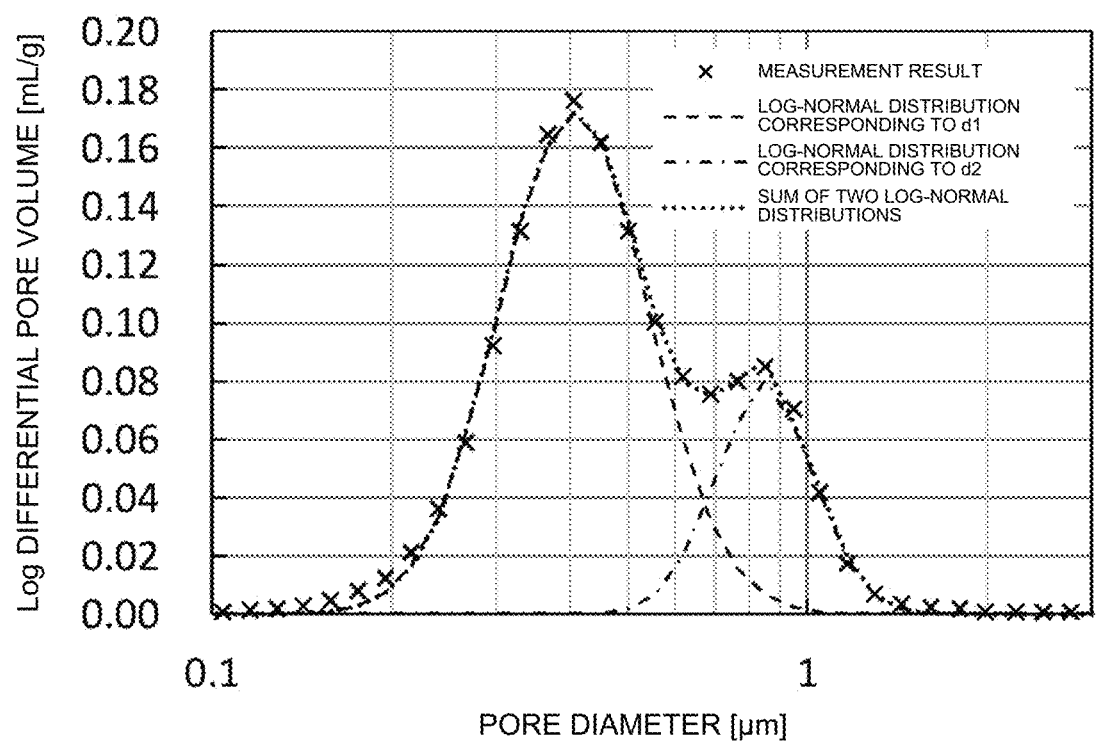
FIG. 7 is a diagram of a volume-based pore diameter distribution of the anode body according to Example 2, which is approximated by the sum of a log-normal distribution A1 corresponding to d1 and a log-normal distribution A2 corresponding to d2.

FIG. 7 shows the result of measuring the volume-based pore diameter distribution (Log differential pore volume) of anode body X2, and an example of a log-normal distribution approximated by the sum of the log-normal distribution A1 corresponding to the pore diameter d1 corresponding to the first peak and the log-normal distribution A2 corresponding to the pore diameter d2 corresponding to the second peak.

The present disclosure can be used for an electrolytic capacitor including an anode body having a porous structure and an anode lead partially embedded in the anode body. The electrolytic capacitor according to the present disclosure can be used for various applications that require favorable electrostatic capacity and low ESR.

What is claimed is:

1. An electrolytic capacitor comprising:
an anode body having a porous structure;
an anode lead partially embedded in the anode body;
a dielectric layer disposed on a surface of the anode body; and
a cathode part that covers at least part of the dielectric layer, wherein:
the anode body includes a first region in which first particles are sintered together and a second region in which second particles are sintered together,
an average particle diameter D1 of the first particles is smaller than an average particle diameter D2 of the second particles,
a volume-based pore diameter distribution of the anode body including the dielectric layer has a first peak in a range of less than or equal to 0.5 μm in pore diameter, and a second peak in a range of more than 0.5 μm in pore diameter, and
a pore volume constituting the second peak is 18% or more of a total pore volume.

2. The electrolytic capacitor according to claim 1, wherein a height of the first peak is larger than a height of the second peak.

3. The electrolytic capacitor according to claim 1, wherein:
the first particles have an average particle diameter D1 of less than or equal to 1 μm, and
the second particles have an average particle diameter D2 of equal to or more than 3 μm.

4. The electrolytic capacitor according to claim 1, wherein a difference (d2−d1) between a pore diameter d1 corresponding to the first peak and a pore diameter d2 corresponding to the second peak is 0.4 μm or more.

5. The electrolytic capacitor according to claim 4, wherein the pore diameter d1 is less than or equal to 0.5 μm, and the pore diameter d2 is equal to or more than 0.7 μm.

6. The electrolytic capacitor according to claim 1, wherein the second particles are flaky particles that are larger in aspect ratio than the first particles.

7. The electrolytic capacitor according to claim 1, wherein in a cross section of the anode body including the dielectric layer, a proportion of an area of the second region to a total area of the first region and the second region ranges from 2% to 40%, inclusive.

8. An electrolytic capacitor comprising:
an anode body having a porous structure;
an anode lead partially embedded in the anode body;
a dielectric layer disposed on a surface of the anode body; and
a cathode part that covers at least part of the dielectric layer, wherein:
the anode body includes a first region in which first particles are sintered together and a second region in which second particles are sintered together,
an average particle diameter D1 of the first particles is smaller than an average particle diameter D2 of the second particles, a volume-based pore diameter distribution of the anode body including the dielectric layer has a first peak in a range of less than or equal to 0.5 μm in pore diameter, and a second peak in a range of more than 0.5 μm in pore diameter, and the second particles are flaky particles that are larger in aspect ratio than the first particles.

9. The electrolytic capacitor according to claim 8, wherein a height of the first peak is larger than a height of the second peak.

10. The electrolytic capacitor according to claim 8, wherein:

the first particles have an average particle diameter D1 of less than or equal to 1 μm, and the second particles have an average particle diameter D2 of equal to or more than 3 μm.

11. The electrolytic capacitor according to claim 8, wherein a difference (d2−d1) between a pore diameter d1 corresponding to the first peak and a pore diameter d2 corresponding to the second peak is 0.4 μm or more.

12. The electrolytic capacitor according to claim 11, wherein the pore diameter d1 is less than or equal to 0.5 μm, and the pore diameter d2 is equal to or more than 0.7 μm.

13. The electrolytic capacitor according to claim 8, wherein in a cross section of the anode body including the dielectric layer, a proportion of an area of the second region to a total area of the first region and the second region ranges from 2% to 40%, inclusive.

14. An electrolytic capacitor comprising:

an anode body having a porous structure;

an anode lead partially embedded in the anode body;

a dielectric layer disposed on a surface of the anode body; and a cathode part that covers at least part of the dielectric layer, wherein:

the anode body includes a first region in which first particles are sintered together and a second region in which second particles are sintered together, an average particle diameter D1 of the first particles is smaller than an average particle diameter D2 of the second particles, a volume-based pore diameter distribution of the anode body including the dielectric layer has a first peak in a range of less than or equal to 0.5 μm in pore diameter, and a second peak in a range of more than 0.5 μm in pore diameter, and in a cross section of the anode body including the dielectric layer, a proportion of an area of the second region to a total area of the first region and the second region ranges from 2% to 40%, inclusive.

15. The electrolytic capacitor according to claim 14, wherein a height of the first peak is larger than a height of the second peak.

16. The electrolytic capacitor according to claim 14, wherein:

the first particles have an average particle diameter D1 of less than or equal to 1 μm, and the second particles have an average particle diameter D2 of equal to or more than 3 μm.

17. The electrolytic capacitor according to claim 14, wherein a difference (d2−d1) between a pore diameter d1 corresponding to the first peak and a pore diameter d2 corresponding to the second peak is 0.4 μm or more.

18. The electrolytic capacitor according to claim 17, wherein the pore diameter d1 is less than or equal to 0.5 μm, and the pore diameter d2 is equal to or more than 0.7 μm.

19. The electrolytic capacitor according to claim 14, wherein the second particles are flaky particles that are larger in aspect ratio than the first particles.

* * * * *